United States Patent [19]
Kimelman

[11] Patent Number: 5,446,838
[45] Date of Patent: Aug. 29, 1995

[54] FLOATING HIGHLIGHTS ON A COMPUTER PROGRAM CODE DISPLAY

[75] Inventor: Douglas N. Kimelman, Danbury, Conn.

[73] Assignee: International Business Machines Corporation, Armonk, N.Y.

[21] Appl. No.: 976,120

[22] Filed: Nov. 13, 1992

[51] Int. Cl.$^6$ .............................................. G06F 15/62
[52] U.S. Cl. ................................. 395/161; 395/153; 395/180
[58] Field of Search ............... 395/144, 152, 153, 920, 395/161; 371/19; 364/193, 578

[56] References Cited

U.S. PATENT DOCUMENTS

| | | | |
|---|---|---|---|
| 4,713,656 | 12/1987 | Cliff et al. | 340/723 |
| 4,872,167 | 10/1989 | Maezawa et al. | 371/19 |
| 5,021,948 | 6/1991 | Nakayama et al. | 371/19 |
| 5,038,348 | 8/1991 | Yoda et al. | 371/19 |
| 5,124,989 | 6/1992 | Padawer et al. | 371/19 |

OTHER PUBLICATIONS

D. Kimelman et al., "The RP3 Program Visualization Environment", IBM Jour. of Res. and Dev vol. 35, No. 5/6, pp. 635–651, Nov. 1991.
S. Utter-Honig et al., "Graphical Animation of Parallel Fortran Programs", IEEE Comput. Soc Press, Los Alamitos, Calif., USA, Nov. 1991, pp. 491–499.
Krumme, D., and Couch, A., "Integrated Debugging and Performance Monitoring for Parallel Programs", Proceedings of the 15th Annual International Computer Software and Applications Conference (1991), pp. 317–318.
Shaw, R., "Multiscope: The OS/2 Debugger that PM Forgot?", PC Magazine vol. 8 No. 189 (Oct. 31, 1989), pp. 33–34.
Heuth, M. and Etheridge, J., "Visualizing the Performance of Parallel Programs," IEEE Software vol. 8 Issue 5, pp. 29–39.
Zernik, D., Rudolph, L., and Snir, M., "Aspects of Parallel Program Execution: Work, Time and the Current State", Proceedigns of the 5th Israel Conference on Computer Systems and Software Engineerng (1991), pp. 162–172.
Mukherjee, R. and Bennett, J., "Simulation of Parallel Computer Systems on a Shared Memory Multiprocessor", Proceedings of the 23rd Anual Hawaii International Conference on System Sciences (1990), pp. 242–251.

Primary Examiner—Heather R. Herndon
Assistant Examiner—N. Kenneth Burraston
Attorney, Agent, or Firm—Louis J. Percello

[57] ABSTRACT

A computer program displayed as text on a graphical display has each line of code divided into segments that can be highlighted. The code is being executed by a number of processors in parallel. A highlight, preferably a background color, which causes a code line segment to look like a large cursor, is associated with each processor. When a processor is executing a line of the program code, the highlight associated with that processor is used to highlight or light up the segment associated with that processor on the line of code being executed by the processor. In a preferred embodiment, the segments for a given processor are of equal lengths and aligned in vertical tracks. This gives the visual effect of the colored background moving along the track as the processor executes the lines of code. Since there are many processors executing the code, there are many tracks on the screen. There can be more than one processor (colored cursor) associated with a single track.

11 Claims, 9 Drawing Sheets

```
 405 {  6   new_move = ((double) (rand() % 1000))/ 1000.0;
        7   if(new_move >0.0 && new_move <= mylife.prob[0])
        8       turn = 0;
        9   else if(new_move > 0.0 && new_move <= mylife.prob[2])   407
       10       turn = 1;

400 {  11   else if (new_move > 0.0 && new_move <= mylife.prob[3])
       12       turn = 2;
       13   else if (new_move > 0.0 && new_move <= mylife.prob[4])
       14       turn = 3;
       15   else if (new_move > 0.0 && new_move <= mylife.prob[5])
       16       turn = 4;
       17   else if (new_move > 0.0 && new_move <= mylife.prob[6])
       18       turn = 5;
       19   temp_dir = (mylife.direction +turn)% 6;
       20   x_move = mylife.x + xmove[temp_dir];
       21   y_move = mylife.y + ymove[temp_dir];
       22   if (!(x_move > X_DIM-1 || x_move < 0 ||
       23         y_move < 0 || y_move > Y_DIM-1) {

420 {  24   mylife.direction = temp_dir;
       25   mylife.x = x_move;
       26   mutex_lock(world_lock);
```

```
 6    new_move = ((double) (rand() % 1000))/1000.0;
 7    if(new_move > 0.0 && new_move <= mylife.prob[0])
 8       turn = 0;
 9    else if (new_move > 0.0 && new_move <= mylife.prob[2])
10       turn = 1;
11    else if (new_move > 0.0 && new_move <= mylife.prob[3])
12       turn = 2;
13    else if (new_move > 0.0 && new_move <= mylife.prob[4])
14       turn = 3;
15    else if (new_move > 0.0 && new_move <= mylife.prob[5])
16       turn = 4;
17    else if (new_move > 0.0 && new_move <= mylife.prob[6])
18       turn = 5;
19    temp_dir = (mylife.direction + turn) % 6;
20    x_move = mylife.x + xmove[temp_dir];
21    y_move = mylife.y + ymove[temp_dir];
22    if (!(x_move > X_DIM-1 || x_move < 0 ||
23        y_move < 0 || y_move > Y_DIM-1) {
24    mylife.direction = temp_dir;
25    mylife.x = x_move;
26    mutex_lock(world_lock);
```

FIG. 5A

```
 6  new_move = ((double) (rand() % 1000))/1000.0;
 7  if(new_move > 0.0 && new_move <= mylife.prob[0])
 8      turn = 0;
 9  else if (new_move > 0.0 && new_move <= mylife.prob[1])
10      turn = 1;
11  else if (new_move > 0.0 && new_move <= mylife.prob[2])
12      turn = 2;
13  else if (new_move > 0.0 && new_move <= mylife.prob[3])
14      turn = 3;
15  else if (new_move > 0.0 && new_move <= mylife.prob[4])
16      turn = 4;
17  else if (new_move > 0.0 && new_move <= mylife.prob[5])
18      turn = 5;
19  temp_dir = (mylife.direction + turn) % 6;
20  x_move = mylife.x + xmove[temp_dir];
21  y_move = mylife.y + ymove[temp_dir];
22  if (!(x_move > X_DIM-1 || x_move < 0 ||
23       y_move < 0 || y_move > Y_DIM-1) {
24      mylife.direction = temp_dir;
25      mylife.x = x_move;
26      mutex_lock(world_lock);
```

FLOATING HIGHLIGHTS ON A COMPUTER PROGRAM CODE DISPLAY

FIELD OF THE INVENTION

This invention relates to the field of visualization of the execution of computer programs by parallel computer systems. More specifically, the invention relates to visualizing how a system of parallel computer processors executes a common computer program.

BACKGROUND OF THE INVENTION

A number of monitoring and display systems have been developed for parallel computer systems. They tend to be used for performance analysis and tuning, or for debugging.

Most of the performance-oriented systems focus solely on the global behavior of the computer system. They display such phenomena as parallelism over time or communication and synchronization over time. Often they display timelines, showing interesting events. These events are either declared explicitly in the program by the user, or are recognized occurrences in the underlying operating system or support library. A few of these systems display code, and allow a user to click on some part of an interesting global display and have the corresponding part of the code highlighted (i.e. the code which was being executed at the time). Some of these systems display more global program structure in some form other than code, such as directed graphs, and then color these structures dynamically to show which program components are active.

A number of these systems display strictly quantitative data concerning performance, rather than trying to present animated displays reflecting the actual behavior of the parallel computer system.

Systems oriented towards debugging tend to either abstract away the details of parallel execution into higher-level events, or to focus on the state and progress of one individual processor at a time.

However, none of these systems displays the program code as the static entity that it truly is nor do these systems try to give the user a feel for how the processors range back and forth over the lines of code while executing the program.

User understanding of the dynamics of how the various processors move over (execute) the code, and how the processors that are executing the code relate to each other can be crucial to understanding the overall (mis)-behavior of the parallel computer system. In many cases, performance problems in parallel computer systems arise from the processors getting out of step in the execution of the single program code. In other cases, a single processor exhibits an erratic pattern compared to all of the rest of the processors, resulting in large delays for the system as a whole.

OBJECTS OF THE INVENTION

An objective of this invention is an improved display for visualizing which line of code in a computer program is being executed by one or more processors that are executing the program in parallel.

Another objective of this invention is an improved display for visualizing which line of code in a computer program is being executed by one or more processors that are executing the program in parallel by visually highlighting the lines of code being executed.

SUMMARY OF THE INVENTION

This invention is an improved method and apparatus for visualizing the execution of a computer program by two or more parallel processors (or two or more parallel processes executing on a uniprocessor), i.e., a parallel processing system. The computer code being executed is displayed on a graphical display as lines of text. Each code line is divided into one or more code line segments at dividing points that are not visible to the user. Each code line segment is associated with one or more processors and/or processes that are executing the code. When a processor (process) executes a line of code, the code line segment associated with the processor (process) is highlighted in some way on the line being executed. In the preferred embodiment, the code line segments in each code line that are associated with a given processor are aligned in a vertical track so that at least one of the dividing points in each code line segment of the track is colinear. As the processor (process) associated with each code line segment in a given track executes the program, a highlighted segment (or segments) in the track appears to move up and down in the track. This allows the user to visualize simultaneously the lines of code being executed by each parallel processor (process).

DETAILED DESCRIPTION OF THE INVENTION

The present invention is a method and apparatus for visualizing the progress of one or more processors (processes) of a system of parallel processors that are executing lines of a common computer program. The method also can be extended to one or more parallel processes executing common code on a uniprocessor system. The invention can operate on any general purpose computer or system of parallel processing computers.

Figure 1:
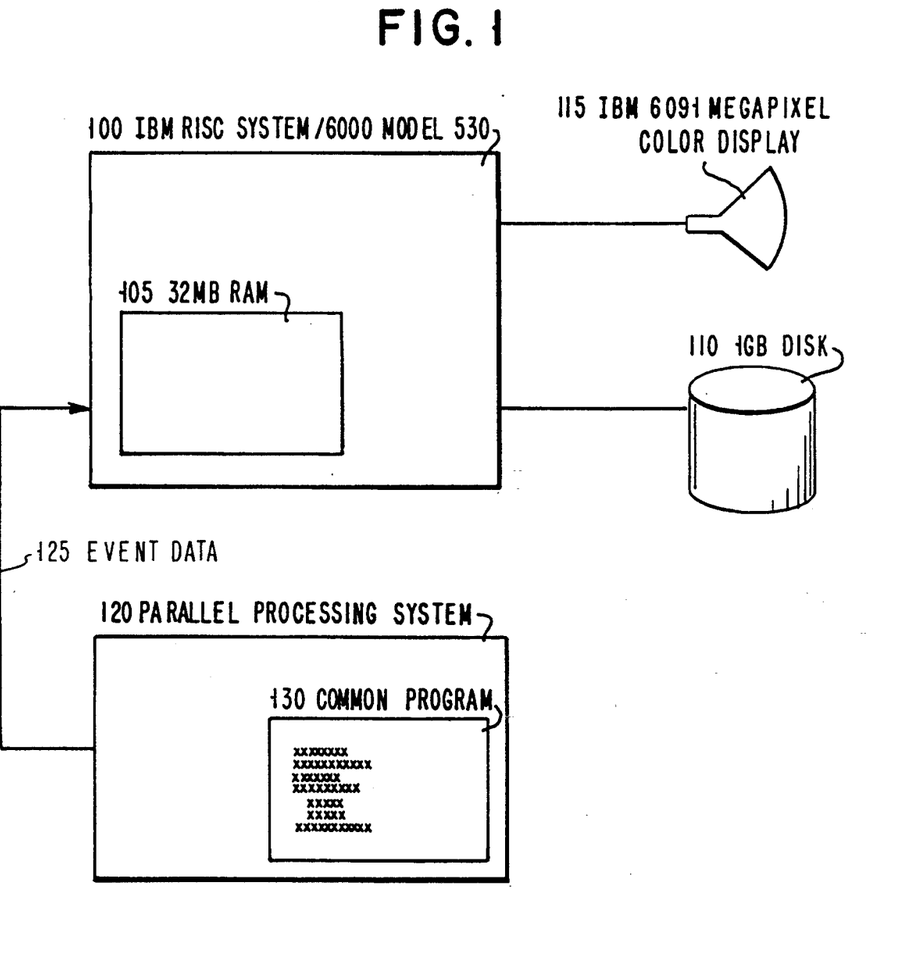
FIG. 1 shows one embodiment of a general purpose computer used in the present invention.

FIG. 1 shows one preferred embodiment that includes: an IBM RISC System/6000 Model 530 workstation 100, with 32 megabytes of memory 105, 1 gigabyte of disk 110, and an IBM 6091 megapixel color display 115, all as described in the manual "RISC System/6000

Product Technology Reference" GA23-2406-01, an AIX operating system, and the AIXwindows environment, as described in the manual "AIX Version 3 for RISC System/6000 General Concepts and Procedures" GC23-2202-01. The system of parallel processors (processes) 120 executes a common computer program 130 and sends event data 125 to the present computer system. Event data would include information about which processor or process in the parallel system 120 is executing a given line of code in the commonly executed computer program 130. RISC System/6000, AIX, and AIXwindows are trademarks of the IBM corporation.

Figure 2:
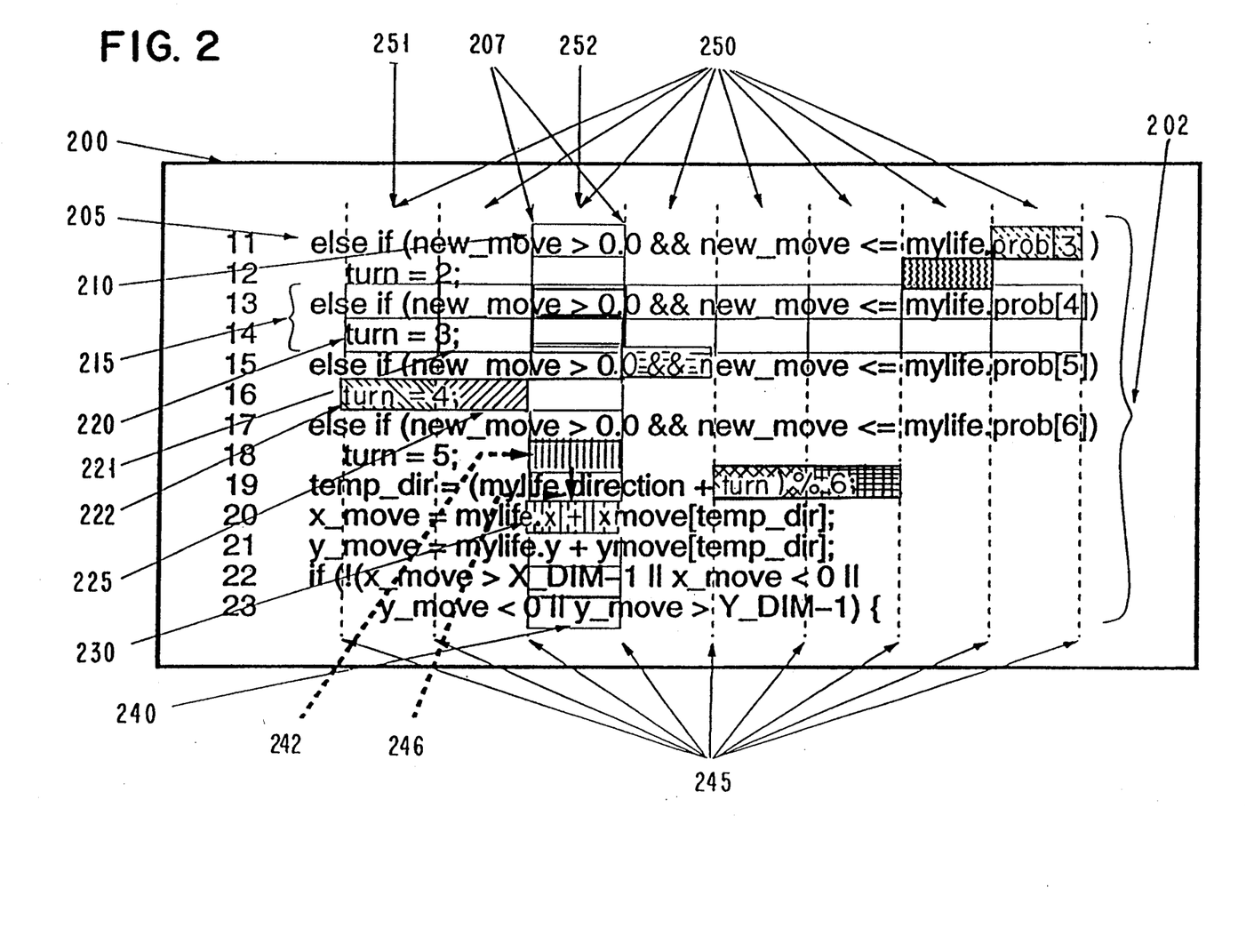
FIG. 2 shows one embodiment a display of computer code with floating highlights generated by the present method.

FIG. 2 illustrates a preferred graphical display 200 for showing which line of code of a computer program each of a plurality of parallel processors is executing. The display shows the computer program, typically a source code program, as text 202 information on the screen of the display. A given program line of code (typically 205) is divided into one or more code line segments (typically 210), at division points typically 207. The division points 207 delineate a given line segment 210 from the rest of the line of code 205 and are not visible to the user viewing the display. Generally, a code line segment 210 will have two division points 207, one on either side of the segment. However, segments that are located on the beginning or the end of the line of code 205 can be delineated from the line of code 205 by using only one division point 207. In a preferred embodiment, each line of code that can be executed by a processor (or process) is divided into code line segments. In a more preferred embodiment, each line that is divided into code line segments 210 is divided into an equal number of segments. The number of segments that each line is divided into is determined by the number of parallel processors (processes) that is to be visualized executing the lines of code 205. In a most preferred embodiment, the division points 207 of the code line segment 210 closest to the beginning of the line of code 205 are colinear 245 with the respective division points 207 of the code line segment 210 closest to the beginning of all the other respective lines of code 205 of the displayed computer code 202. Also, the division points 207 of code line segment 210 second closest to the beginning of the line of code 205 are colinear 245 with the respective division points 207 of the code line segments 210 second closest to the beginning of all the other respective lines of code 205 in like manner, the division points 207 of the third, and other line segments 210 on a given line of code 205 are colinear 245 with their respective code line segments 210 on all other lines of code 205 on the display 200. Although, in the preferred embodiment, the lines 245 on which colinear division points 207 lie are not visible to the user, the lines 245 do define a series of tracks 250 running through the code text 202. In the most preferred embodiment, these tracks 250 run in the vertical direction. The location of a given code line segment 210 in a given line of code 205 determines the processor (process) in the parallel processing system to which the code line segment 210 is associated. As a result, each track 250 defined by the division point 207 lines 245 is associated with a processor in the parallel processing system executing the program represented by the text 202. In alternative embodiments, more than one processor can be represented by one track 250. For example, code line segment 220 in line 14 of the text 202 is associated with processor 1 while code line segment 221 (in this example adjacent to code line segment 220 on line 14) is associated with processor 2. Code line segment 222 is in the same line location in line 16 of the text 202 as code line segment 220 is in line 14 and therefore, code line segment 222 is also associated with processor 1. Furthermore, the track 251 defined by the lines 245 colinear with the division points 207 of segments 220 and 222 will also be associated with processor 1. In like manner, track 252 will be associated with processor 2 because track 252 is defined by the lines 245 passing through the division points 207 of code line segment 221.

Figure 3:
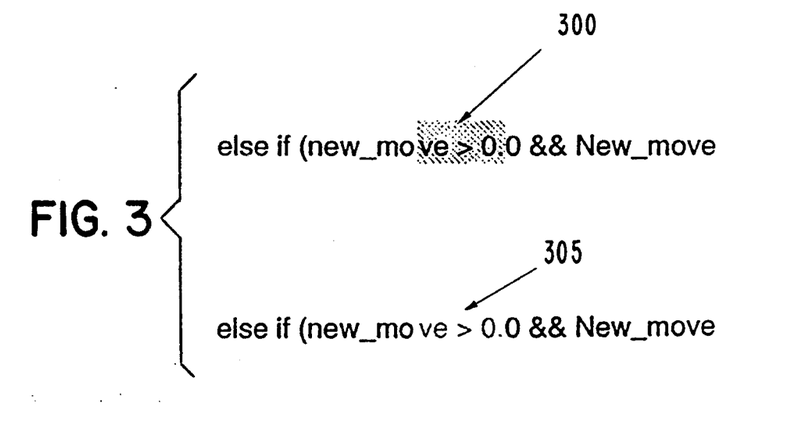
FIG. 3 shows two alternative methods of highlighting computer code segments.

Generally, the code line segments 210 are highlighted in various ways when the processor that they are associated with is executing the line of code 205 containing the code line segment 210. The code line segments can be highlighted by coloring the background of the segments 210, coloring the text contained with the segment 210, shading the segment 210, placing patterns in the segment 210 or using any of the other known highlighting techniques known in the art. For example, code line segment 225 might be highlighted by coloring the background of the segment or the part of the code text with a color, like green, when processor 2 is executing line 16. FIG. 3 illustrates two ways of highlighting code segments. FIG. 3a shows a code line segment 210 being highlighted by coloring 300 the background of the segment, and FIG. 3b shows a code line segment being highlighted by coloring the foreground or text within the segment 210. (Note that code line segment 225 is associated with processor 2 because of its position in line 16. Likewise, track 252, containing code line segment 225, is associated with processor 2). A second processor, associated with the track 252, could use a different color to highlight a code line segment 210 of a line of code 205 that the second processor is executing (or could highlight the segment 210 in a different way.)

FIG. 2 shows a vertical track 240 containing code line segments 242 on line 18 and 230 on line 20. This track 240 and the code line segments contained within the track, are associated with a processor 3. When processor 3 was executing line 18, code line segment 242 was highlighted with a background color, like yellow. When processor 3 completed executing line 18, the highlighting on this segment 242 is turned off. When processor 3 begins executing line 20 of the code text 202, segment 230 of line 20 is highlighted with the yellow background. When this happens, it appears to the user, that the highlighting, in this example a colored background bar or cursor, has moved (arrow 246 in track 240) from line 18 to line 20. Therefore, as processor 3 executes one line of code then another, the highlighting moves from one line of code to the next respective line of code being executed giving the appearance to the user that the highlighting is moving within the track 240 associated with processor 3. Likewise, each highlighting means associated with each processor (in the parallel processing system) appears to move from line to line (code line segment to code line segment) within the track associated with their respective processor. Therefore, a user observing this display is given an indication of which line of code in the code text 202 each processor is executing at a given time by the highlighting means associated with each executing processor moving 246 in tracks on the display 200.

Figure 4:
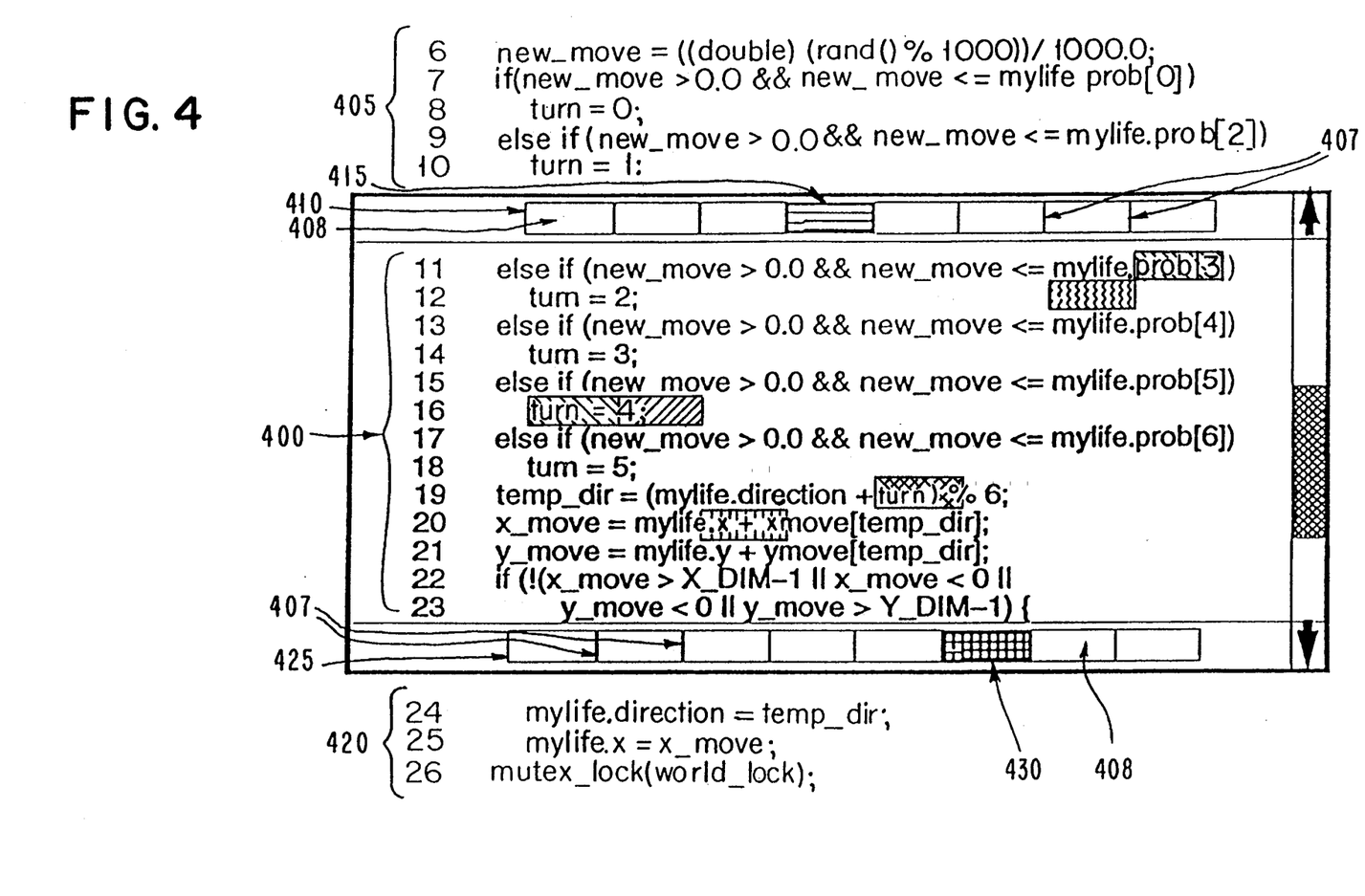
FIG. 4 shows one preferred graphical display of the present invention that includes gutters above and below the computer code part of the display.

FIG. 4 shows an alternative preferred embodiment which is the graphical display of FIG. 2 with gutters. Gutters are lines 410 and 425 that border an area of the display that shows part 400 of a computer program as text. The gutter lines are divided into gutter segments, typically 408, at gutter division points 407 in the same manner as the lines of code 400 are. In the most preferred embodiment, the gutter division points 407 are colinear with division points 207 of the code lines so that a gutter segment 408 for a given gutter (line 410 or 425) falls within and is associated with a track 250 of the displayed code text 400. As before, the gutter division points 407 and the lines on which they lie are not visible to the user in the preferred embodiment. FIG. 4 also shows part of the code text which is not shown on the graphical display. Some of this non-displayed code can precede 405 the displayed code 400 and some of the non-displayed code can follow 420 the displayed code 400. (Generally, preceding (following) code is code lines that are listed in a computer program prior (subsequent) to a given line of code in the computer program.)

The gutter lines (410 and 425) and the gutter segments 408 are used to indicate that lines of code that are not displayed 405 and 420 are being executed by processors in the set of parallel processors. For example, gutter segment 415 in gutter line 410 lies in a track (the fourth from the beginning of the code lines) that is associated with processor 4. When processor 4 is executing a line of code 405 preceding the displayed code lines 400 gutter segment 415 is highlighted to indicate processor 4 is executing a non-displayed preceding line of code 405. This highlighting could be coloring the gutter segment 415 with a color associated with processor 4, e.g. blue. Any other known highlighting methods can be used. Alternatively, if there is more than one processor that is executing :non-displayed preceding line of code 405 and that is associated with same track as gutter segment 415, the gutter segment 415 could be highlighted in two ways, e.g. half blue for processor 4 and half shaded for processor 5. In another embodiment, two or more gutter lines like 410 could be placed above the displayed code 400. If two processors associated with the same track are executing non-displayed preceding code 405, the first processor (processor 4) would have a highlighted gutter segment in its corresponding track and the other processor (processor 5) would have a highlighted gutter segment in the same track in the second gutter line. The gutter line(s) that have segments indicating when non-displayed preceding code 405 is being executed are located above the displayed code 400 in the most preferred embodiment and are called top gutter lines. These variations can be expanded to any number of processors.

In similar fashion, the non-displayed following code 420 may be executed by one or more of the processors in the set of parallel processors (processes). This is indicated by highlighting gutter segments, typically 408, in another gutter line 425. In the preferred embodiment, this gutter line is placed at the bottom of the displayed code 400 and is called a bottom gutter line(s) 425. For example, the color purple and track 6 (containing gutter segment 430) are associated with processor 6. When processor 6 is executing a line of code in the non-displayed following code 420 area, the bottom gutter 425 gutter segment 430 in track 6 is highlighted purple. When processor 6 stops executing non-displayed following code 420, the gutter segment is no longer highlighted purple. As before, if a given track, like track 6 is associated with more than one processor, the gutter segment 430 can be highlighted in parts, where the highlighting in each part represents nondisplayed following code 420 being executed by a different processor associated with track 6. Again, multiple bottom gutter lines 425 can be used for this purpose.

Figure 5B:
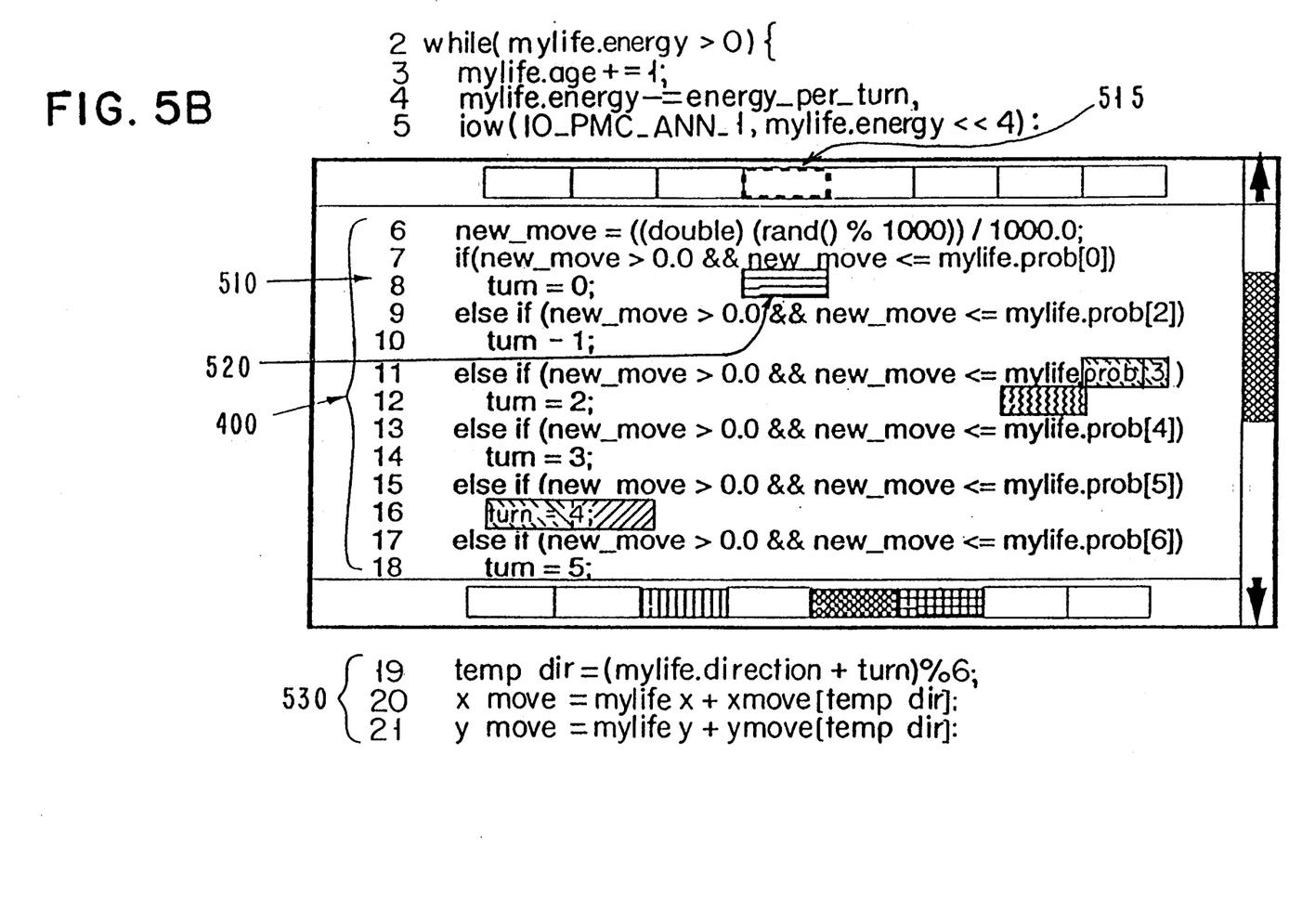
FIG. 5 shows another preferred graphical display of the present invention that includes gutters above and below a scrolling computer code part of the display.

FIG. 5 illustrates another preferred embodiment, the graphical display of FIG. 4 and with a scrolling display. In this embodiment, the displayed code 400 is scrolled, using any of the known methods in the art. As the display scrolls up, non-displayed preceding code 500 enters the top of the displayed area 400 and is displayed. Concurrently, text from the bottom of the displayed area 400 enters the non-displayed following code area 520 and is no longer displayed. Conversely, when the display is scrolled down, non-displayed following code 520 enters the bottom of the displayed area 400 and displayed code at the top of the displayed area 400 enters the non-displayed area 500.

The illustration (FIG. 5a) shows a code line (line 8) in the non-displayed preceding code area 500 being executed by processor which is associated with track 4 containing gutter segment 505. Because processor 4 is executing non-displayed preceding code 500, gutter segment 505 is highlighted in a way associated with processor 4. As the text in the displayed area 400 is scrolled down the executing line 8 leaves the non-displayed preceding code area 500 and enters the displayed code area 400. When this happens, the top gutter segment 505 stops 515 being highlighted because the executing line is now being displayed. Because the line of code number 8 is still being executed by processor 4, a code line segment 520 becomes highlighted in the same track as 515. In the preferred embodiment, the code line segment 520 is highlighted in a way associated with processor 4, a background color that corresponds to processor 4. In the same way, nondisplayed following code 520 being executed, and being scrolled up in the display, causes the associated gutter segment to not be highlighted after the executing code line(s) enter the displayed area 400. In these cases, code line segments are highlighted as described above.

Figure 6:
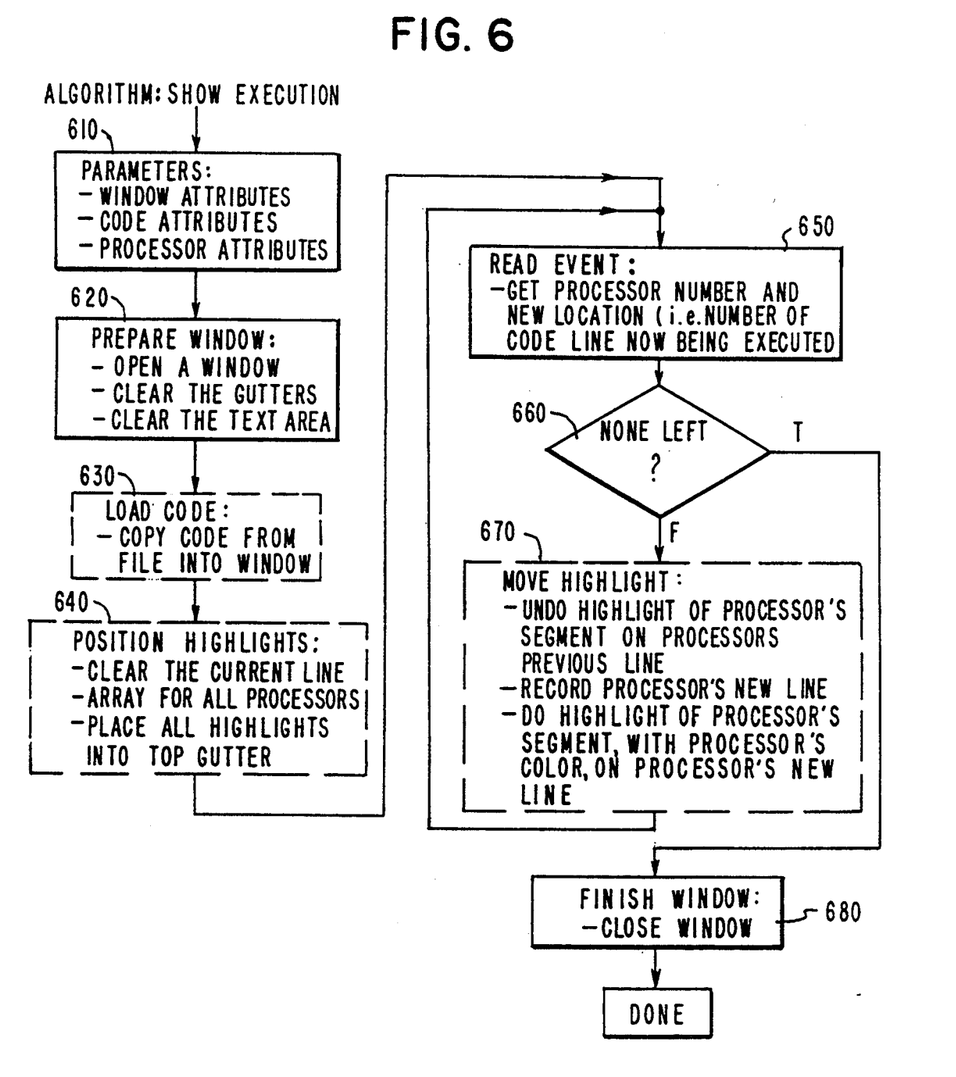
FIG. 6 is a flowchart describing the steps of the present method.

FIG. 6 shows the steps of the general algorithm of the present invention. Note that in one preferred embodiment, the algorithm is incorporated into a larger computer system that provides a variety of displays to visualize the execution of a single program by the parallel processors or processes. In this embodiment, rather than forming a stand alone program, the initialization code (steps 610–640), the loop body (steps 650–670), and the termination code (step 680), would be separated. The initialization code would be invoked along with all of the other initialization code in the system, at initialization time, by the system initialization driver. The body of the loop would be invoked by the system main loop driver only when an event Containing a processor number and line number is available (thus there would be no need For the check leading to the loop exit in this flowchart). The termination code would be invoked along with all of the other termination code, at termination time, by the system termination driver.

The algorithm begins, box 610, by accepting its parameters. These include:
1. window attributes—the position on the computer display screen of the upper-left corner of the window in which the display of execution of program code is to be produced; the number of lines and columns (one or more columns comprises a track) of program code to be displayed, the color of the window background, and the color to be used by default for text background; the color to be used by default for text foreground; a list of colors to be used to highlight code line segments for the various processors;

2. program code attributes—the name of the file containing the program code; the line number (in the code file) of the line of program code to be displayed on the first code line of the window; and 3. processor attributes—the number of processors to be shown.

The algorithm continues, box 620, by preparing the window in which the lines of program code are to be displayed. The window is opened, the gutters are cleared, and the main text area, where the code lines will be displayed is cleared.

The following assumptions are made concerning the window (and constitute the requirements For any graphics or windowing system over which the algorithm is to be implemented):

1. The window can be used to display code in the form of color text; it consists of a number of rows and columns of positions, each of which displays a single character, each with its own foreground and background color; and it maintains an internal record of the contents of the window (i.e. the character, foreground color, and background color displayed at each position of the window) e.g. for purposes of refreshing the display whenever necessary; and 2. The window must support the following operations: clearing the window (i.e. setting all positions to the "blank" character—a character which is all background and no foreground); displaying a new character at some position (using the default foreground and background colors); displaying a line of new characters starting at some position (using the default foreground and background colors); changing the background color of the character at some position; and changing the foreground color of the character at some position.

As discussed above, one embodiment of the present invention uses an AIX Windows Environment to create windows on the display. However, any environment meeting the above windowing requirements can be used as well.

The lines of the window are used by the algorithm as follows: the first (top) line of the window is used for the top gutter, and the last (bottom) line of the window is used for the bottom gutter, thus the window is created with two more lines than the number of lines requested by the parameters.

In box 630, which is described in greater detail below, the program code is copied from the file into the window. In box 640, which is described in greater detail below, an array which is used to record which line each processor is currently executing is cleared, and all of the highlights are placed into the top gutter.

In box 650, the body of the main loop of the algorithm begins by reading an event (a small data record created whenever a processor moves from executing one line to executing another). The number of the processor (responsible for the event) is extracted from the event along with the number of the line of program now being executed. In box 660, the loop ends when there are no events left to read.

Note that the line numbers contained in the event data must correspond to the line numbers on the form of program code being displayed. If source code is being displayed, then the event data must contain source line numbers. This could be accomplished by having the user or the compiler insert instructions into the program which explicitly put source line numbers into the event. Alternatively, the system which manages events could map object code addresses back into source line numbers using well-known techniques commonly incorporated into debuggers.

Also note that in some cases events are generated too quickly, and the display is updated too quickly, for a user to be able to discern or comprehend the progress of the various processors in these cases, the animation can be presented more slowly by having the system buffer the incoming event data, in a file for example, and then pausing for some amount of time, at box 650, each time before reading another event and updating the display based on it.

Further note that in some cases the volume of event data generated by the parallel computer system exceeds the capacity available for communicating the event data to the visualization system, or it exceeds the capacity available for storing the data at the visualization system. In these cases, the volume of event data can be reduced, without reducing the effectiveness of the display, by only generating events for lines which begin major blocks of program code. Examples of such lines might be lines 7, 19, 22 and 26 in FIG. 5. Identification of such lines might be done explicitly by a user when the program is being prepared, or it could be done automatically by an advanced compiler.

In box 670, which is described in greater detail below, the loop continues by moving the highlight for the processor given by the event, from the line which the processor was previously executing, to the line given by the event as being the line which is now being executed by the processor.

At step 680, the algorithm terminates after closing the window which had been created and used to display program code.

Figure 7:
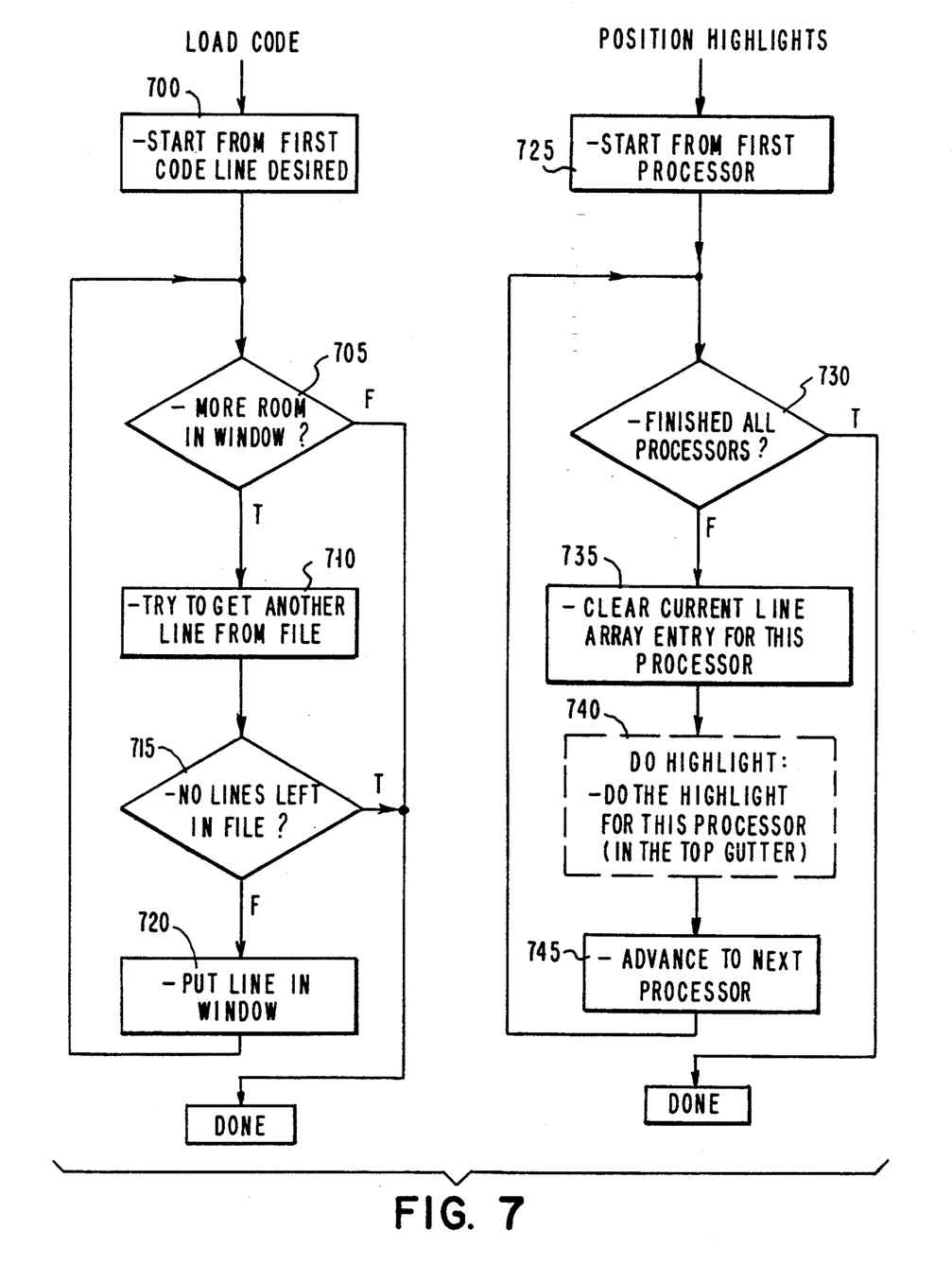
FIG. 7 is two flowcharts describing the detail steps of loading the displayed computer code and positioning the highlights.

FIG. 7 illustrates the details of loading lines of program code 630 into the window. At box 700 a loop begins, starting with the first line of program code which is desired to be displayed. At box 705 the loop ends when there is no more room for displaying additional lines of program code. At box 710 another line of program code is retrieved from the file. The loop ends at this point, at box 715, in the case that no lines of code remain in the file. At box 720, the line of code is placed into the window using the window operation mentioned above for displaying a line of new characters.

FIG. 7 also illustrates the details of initially positioning the highlights 640 for each of the processors. Steps 725–745 constitute a loop which, for each processor, clears the entry in the array which is used to record the number of the line of program code which the processor is currently executing, and then does a highlight for that processor. By virtue of the cleared entry, the highlight will appear in the top gutter. At box 725 a loop begins, starting with the first processor. At box 730 the loop ends when the array entries have been cleared and the highlights have been positioned for all of the processors. At box 735 the array entry for the current processor is cleared, and at box 740, which is described in greater detail below, the highlight is done for the current processor. Box 745 advances to the next processor.

Figure 8:
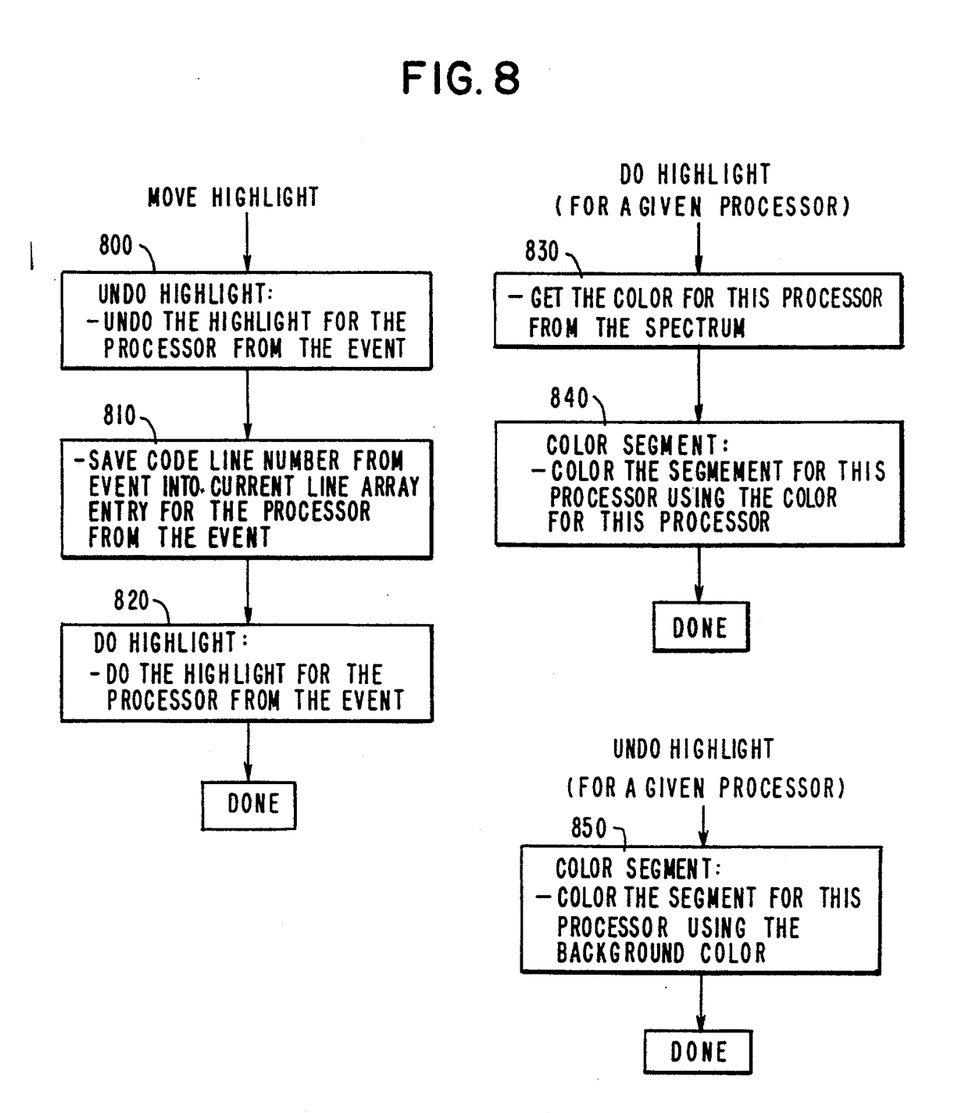
FIG. 8 is three flowcharts describing the detail steps of manipulating the highlights.

FIG. 8 illustrates the details of moving a highlight from one line to another 670, for the processor given by the event. At box 800, which is described in greater detail below, the old highlight, of the segment associated with that processor, on the line of code which previously was being executed by that processor, is undone. At box 810, the number of the line which that processor is now executing is recorded in an array described below. At box 820, which is described in greater detail below, the new highlight, of the segment associated with that processor, on the line of code which is now being executed by that processor, is done.

FIG. 8 also illustrates the details of doing a highlight 740 and 820 for a given processor. At step 830, a computation is performed to determine the color associated with the given processor.

The calculation required at step 830 is:

color=spectrum[1+((processornumber−1)MOD nSpColors)];

where:
  spectrum is an array [1:nSpColors] of colors; the i-th entry is used to do highlights for the i-th processor (wrapping around if i>nSpColors), and
  nSpColors is the number of entries in spectrum.

At box 840, which is described in greater detail below, the color associated with the given processor is used to color the segment associated with that processor.

FIG. 8 additionally illustrates the details of undoing a highlight 800 for a given processor. At box 850, which is described in greater detail below, the background color is used to color the segment associated with that processor.

Figure 9:
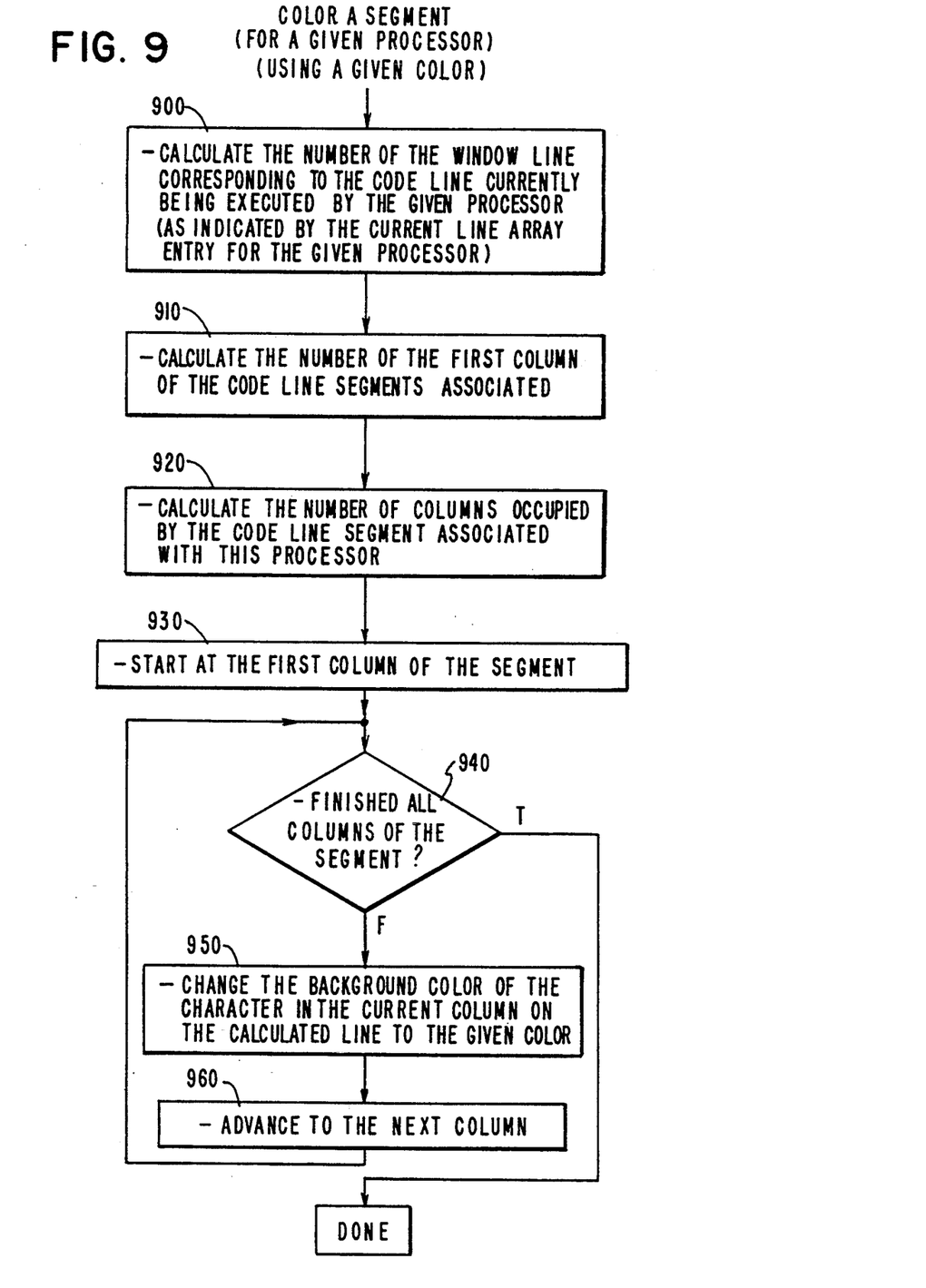
FIG. 9 is a flowchart describing the detail steps of highlighting or coloring a segment of computer code on the display.

FIG. 9 illustrates the details of coloring the segment 840 and 850 associated with a given processor, on the code line being executed by that processor, using a given color.

At step 900, a computation is performed to determine which line of the display corresponds to the line of code currently being executed by the given processor.

The calculation required at step 900 is:

line=currentLine[processornumber]−firstLine+2;

if(line<1)
  line=1;
else if(line>nLines+2)
  line=nLines+2;
where:
  n Lines is the number of lines of source to be displayed,
  firstLine is the line number (in the code file) of the line of program code to be displayed on the first code line of the display,
  currentLine is an array[1:nProcessors] of line numbers (of lines in the code file); the i-th entry is the line which the i-th processor is currently executing i.e. the line to which the i-th processor moved most recently.

At step 910, a computation is performed to determine the starting point on the line of the segment associated with the given processor.

The calculation required at step 910 is:

firstColumn=1+((processornumber−1) * nCols) DIV numofprocessors;
where:
  firstColumn is the column number of the first character of the segment for this processor, and
  nCols is the number of lines and columns of source to be displayed.

At box 920, a computation is performed to determine the width of the segment associated with the given processor.

The calculation required at step 920 is:
  lastcolumn=(processornumber * nCols) DIV numofprocessors;
  if(lastcolumn<firstColumn) lastcolumn=firstColumn;
  numcolumns=lastcolumn-firstColumn+1;

Steps 930–960 constitute a loop which colors all of the characters of the segment, one at a time.

Given this novel disclosure, one skilled in the art could develop other embodiments of the present invention which are within the contemplation of the inventor.

I claim:

1. A graphical display for showing which line of code of a computer program each of a plurality of parallel processors is executing comprising:
  a plurality of lines of computer code having an undisplayed part of one or more computer code lines not displayed on the display and a displayed part of one or more computer code lines displayed on the display, each line in the displayed part being broken into one or more code line segments, each line segment delineated from other line segments on the code lines by one or two division points, each line segment being associated with at least one processor of the plurality of processors;
  a first gutter line, segmented in the same wax as the code lines in the displayed part, a gutter segment being highlighted when a code line in the undisplayed part is executed by a processor associated with the gutter segment; and
  a highlight associated with each processor which highlights the line segment of the associated processor on the line in the displayed part when the associated processor is executing a line in the displayed part.

2. A graphical display, as in claim 1, where the lines of code are segmented so that code line segments associated with a processor form a vertical track associated with the processor, the track formed by the code line segments associated with the processor in each code line being aligned so that at least one division point of each segment lies on a line, and a color associated with that processor moves up and down in the track highlighting the code line segment associated with the processor in the code line the processor is executing.

3. A graphical display, as in claim 1, where the highlight in the line segment is a background color of the line segment.

4. A graphical display, as in claim 1, where the highlight of the line segment is a color of one or more characters in the line segment.

5. A graphical display, as in claim 1, where the undisplayed part further comprises a first part and a second part, the first part preceding the displayed part and the second part following the displayed part and the first gutter line is associated with the first part and further comprising
  a second gutter line segmented in the same way as the code lines and associated with the second part,
  where a first processor executing code lines in the first part causes a gutter segment associated with the first processor in the first gutter to be highlighted using a highlight associated with the first processor and where a second processor executing code lines in the second part causes a gutter segment associated with the second processor in the second gutter to be highlighted using a highlight associated with the second processor.

6. A graphical display, as in claim 5, where the first gutter is displayed above the code part of the display and the second gutter is displayed below the code part of the display.

7. A graphical display, as in claim 5, where the displayed code is scrolled to cause a code line being executed in the first part to enter the displayed part, the highlighted segment of the gutter associated with the processor executing the code line being turned off as the code line enters the displayed part, and the segment of the code line associated with the processor executing the line being highlighted.

8. A method of displaying which of a plurality of parallel processors is executing a line of code, comprising the steps of:
   dividing a display of a plurality of lines of computer code into an undisplayed part of one or more computer code lines not displayed on the display and a displayed part of one or more computer code lines displayed on the display;
   breaking up one or more code lines in the displayed part into segments, each segment associated with at least one of the parallel processors;
   breaking up a first gutter line into segments in the same way as the code lines in the displayed part; and
   highlighting a first segment in the displayed part with a highlight associated with a first processor when the first processor is executing a first code line in the displayed part and highlighting a second gutter line segment with a highlight associated with a second processor when the second processor is executing a second code line in the undisplayed part.

9. A method of displaying lines of code, as in claim 8, where a first segment is highlighted in a second line of code when the first processor starts executing the second line of code and the first segment of the first line of code in unhighlighted.

10. A method of displaying lines of code, as in claim 9, where the segments corresponding to a processor are all in a single track.

11. A computer apparatus comprising:
   a color graphical display for showing a plurality of lines of computer code, the lines of computer code comprising a displayed part of one or more computer code lines displayed on the display and an undisplayed part of one or more computer code lines not displayed on the display, each line displayed in the displayed part being broken into one or more code line segments at division points, each line segment being associated with at least one processor of the plurality of processors;
   a gutter line, segmented in the same way as the code lines in the displayed part, a gutter segment being highlighted when a code line in the undisplayed part is executed by a processor associated with the gutter segment; and
   a highlight associated with each processor which highlights the line segment of the associated processor on the line in the displayed part which the associated processor is executing.

* * * * *